United States Patent [19]

Zegel

[11] 4,008,527

[45] * Feb. 22, 1977

[54] EDUCATIONAL ACCOUNTING DEVICE

[76] Inventor: Snyder M. Zegel, 108 Monell Ave., Islip, N.Y. 11751

[ * ] Notice: The portion of the term of this patent subsequent to June 17, 1993, has been disclaimed.

[22] Filed: Apr. 2, 1975

[21] Appl. No.: 564,458

Related U.S. Application Data

[63] Continuation-in-part of Ser. No. 462,439, April 19, 1974, Pat. No. 3,889,395.

[52] U.S. Cl. .............................. 35/24 R; 273/1 R
[51] Int. Cl.² ................................ G09B 19/18
[58] Field of Search ............ 35/24 R, 24 A, 24 B, 35/24 C; 40/341, 352; 273/1 R

[56] References Cited

UNITED STATES PATENTS

| | | | |
|---|---|---|---|
| 678,616 | 7/1901 | Gregory | 35/24 R X |
| 1,234,743 | 7/1917 | Ellis | 35/24 A |
| 1,333,686 | 3/1920 | Spotswood | 40/70 R |
| 1,415,278 | 5/1922 | Tod | 35/24 C |
| 1,587,391 | 6/1926 | McKee | 35/24 R |
| 1,611,274 | 12/1926 | Larson | 35/24 A |
| 1,751,082 | 3/1930 | Grant | 35/24 R |
| 2,134,039 | 10/1938 | Gibbs | 40/70 R |
| 2,702,954 | 3/1955 | Cline et al. | 40/70 R |
| 3,423,847 | 1/1969 | Barbee | 35/24 R |
| 3,739,739 | 6/1973 | Brase | 40/352 X |
| 3,889,395 | 6/1975 | Zegel | 35/24 R |

FOREIGN PATENTS OR APPLICATIONS

| | | | |
|---|---|---|---|
| 421,907 | 1/1935 | United Kingdom | 40/352 |
| 824,971 | 12/1959 | United Kingdom | 35/24 R |

Primary Examiner—William H. Grieb
Attorney, Agent, or Firm—Salvatore A. Alamia

[57] ABSTRACT

A plurality of transaction cards adapted for use with an educational accounting device are disclosed. Each card bears accounting indicia on its upper and lower portions. A pair of numeral-bearing disks are mounted adjacent to the upper and lower portions of the cards. The displayed numerals, together with the accounting indicia, represent part of an accounting entry.

3 Claims, 8 Drawing Figures

EDUCATIONAL ACCOUNTING DEVICE

This is a continuation-in-part of my earlier application, Ser. No. 462,439 filed Apr. 19, 1974, now U.S. Pat. No. 3,889,395, issued June 17, 1975.

This invention relates generally to a teaching aid and more particularly to a novel educational device useful as an aid in teaching the rudimentary principles of accounting. The current methods of teaching the double entry system of bookkeeping involve long and detailed formal study. Such methods may be appropriate for those who desire a career in accounting. However, with the increasing complexities in the day to day operations of most businesses, there exists the need for some teaching aid or educational device which is useful as an aid in teaching the rudimentary principles of double entry accounting for the non-professional.

The fundamental accounting equation for any business entity, stated in its simplest terms, is that its assets equals its claims. All forms of property owned by a business entity and to which one can ascribe a money value are called assets. Since credit now plays an important role in business and since credit is often extended to enable a business entity to acquire assets, the law extends to creditors a "primary" claim on the assets. The proprietorship of the business entity may then be viewed as having a "secondary" claim on the assets, i.e. a claim on the assets limited to that left after the primary claims have been satisfied.

In accounting, the primary claims are called liabilities and the secondary claims are called equity or capital. Stated in other words, equity or capital is a representation of the net worth of a business entity, measured by the value of the assets less the value of the liabilities. Consequently, the fundamental equation stated above may be expanded to: ASSETS equal LIABILITIES plus CAPITAL.

Generally it is an object of the present invention to provide a novel teaching aid for simply and effectively demonstrating the rudimentary principles of double-entry accounting.

Specifically, it is an object of the present invention to provide a novel, game-like teaching device for illustrating the inter-relationship of assets, liabilities and capital and the several accounts that may exist under each category in different types and forms of business entities.

The above and other objects of the present invention are accomplished by a novel educational device comprising, a plurality of transaction cards, a plurality of ledger pages, each page adapted to receive said transaction cards, a plurality of title tags, means at the top of each ledger page for receiving and displaying said title tags, and means on each transaction card for recording and displaying accounting indicia.

While the specification concludes with claims particularly pointing out and distinctly claiming the subject matter of the present invention, the presently preferred embodiment of the invention is described in the following detailed description taken in conjunction with the accompanying drawing in which:

FIG. 1 is a graphic representation of the fundamental accounting equation.

FIGS. 2(a)-2(b) shows both sides of a debit transaction card constructed in accordance with the present invention.

FIGS. 3(a)-3(b) shows both sides of a credit transaction card constructed in accordance with the present invention.

Figure 1:
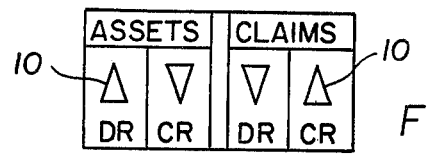

With reference to the drawing, FIG. 1 illustrates a graphic representation of the fundamental accounting equation: Assets equal Claims. It is noted that the arrowhead 10 demonstrates that an increase in Assets would be posted on the debit side of the asset account and an increase in Claims would be posted on the credit side of the claims account. Similarly, the arrowheads indicate the posting of decreases in Assets or Claims.

This graphic representation of the fundamental accounting equation utilizing arrowheads is reproduced on each transaction card 12, 22 to assist the student in understanding how each side of the equation is to be debited or credited.

Figure 2A:
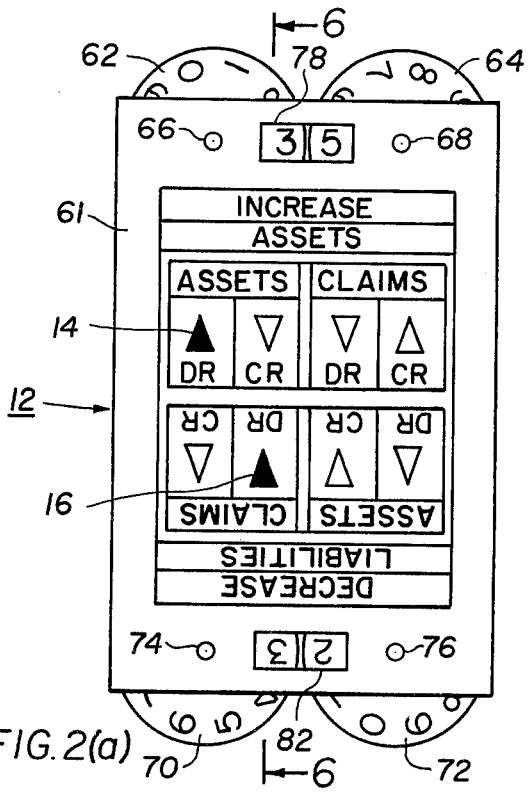
Figure 2B:
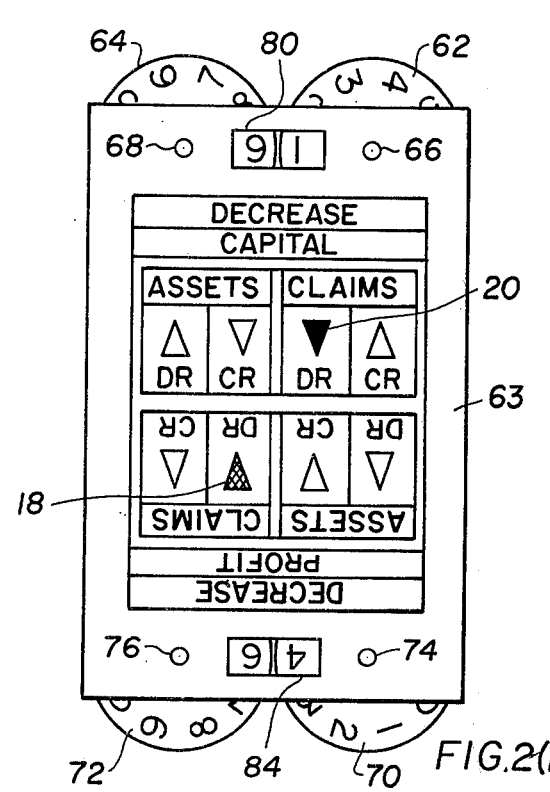

Both sides of a debit transaction card 12 are illustrated in FIG. 2. Side 61, FIG. 2(a), shows an increase in assets and a decrease in liabilities. Side 63, FIG. 2(b), shows a decrease in capital and a decrease in profits. The arrowhead 14 representing an increase in assets (debit) is colored or otherwise filled-in to clearly demonstrate to the student that when a transaction calls for an increase in assets such increase is to be posted on the debit or left side of the particular asset account. Similarly, indicating arrowheads 16, 18 and 20 demonstrate that decreases in liabilities, capital or profit are to be "debited". As a further aid to the student, although not essential to the present invention, all indicating arrowheads for assets are to be colored or filled-in in a manner clearly distinguished from that for claims indicating arrowheads. In addition, indicating arrowheads representings an increase or decrease in temporary accounts such as profit, income or expenses, may be cross-hatched or striped. (See arrowheads 18, 28)

Figure 3A:
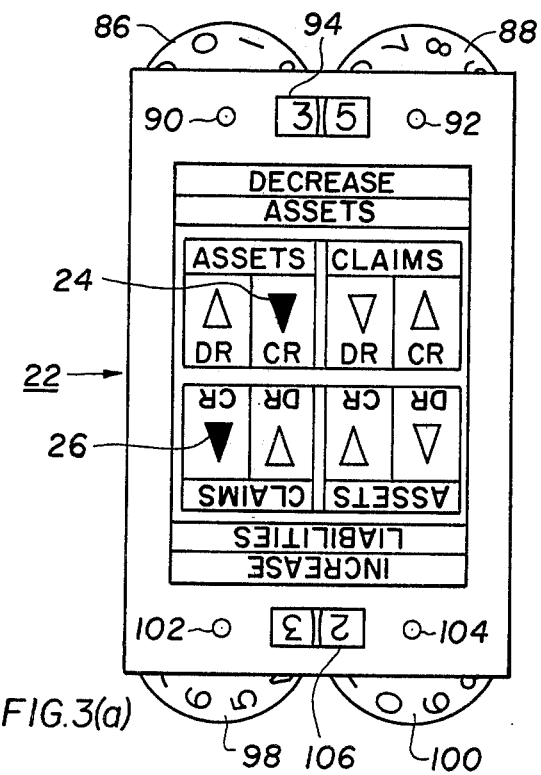
Figure 3B:
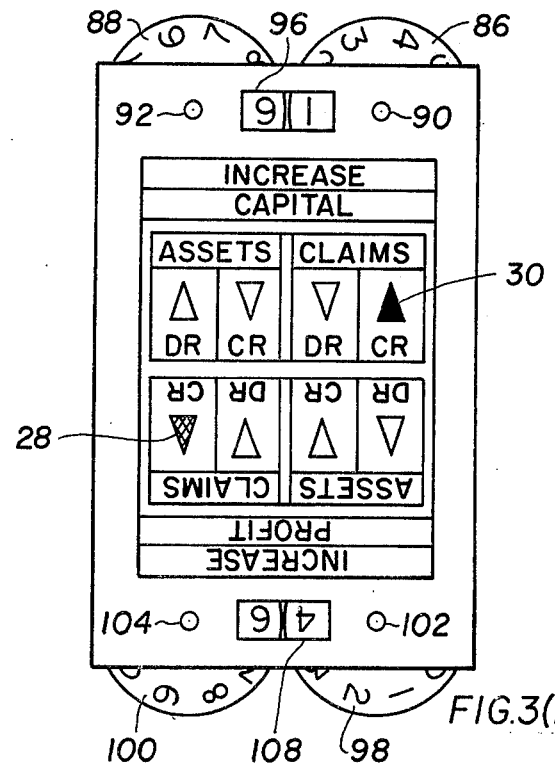

FIG. 3 illustrates both sides of a credit transaction card 22. Indicating arrowhead 24 demonstrates that a decrease in assets is to be posted on the credit or right side of the particular asset account. Similarly, indicating arrowheads 26, 28 and 30 demonstrate that increases in liabilities, capital or profit are to be credited or posted on the right side of the particular claims account.

Consequently, the composition of the indicating arrowhead not only demonstrates to the student where the entry is to be posted (i.e. debited or credited) but also whether such entry affects a permanent or temporary account.

Two disks 62, 64 are rotatably attached to the top portion of debit transaction card 12 by rivets 66, 68. Disks 70, 72 are rotatably attached to the bottom portion of card 12 by rivets 74, 76. Each disk has a circular series of numerals from 0 through 9 on both sides thereof and protrudes slightly from the edge of card 12 in order that each disk may be conveniently turned by the fingers. The numerals on disks 62, 64 are exposed through sight window 78 on one side of card 12, and through sight window 80 on the other side. Similarly, the numerals on disks 70, 72 are exposed through window 82 on one side of card 12 and through window 84 on the other side.

Sight window 78 displays the amount by which an asset has been increased and indicating arrowhead 14 shows that this entry is to be debited in the appropriate asset account. Similar accounting indicia is provided by: sight window 80 in conjunction with indicating arrowhead 20; window 82 together with indicating arrowhead 16; and, sight window 84 together with indicating arrowhead 18.

Figure 4:
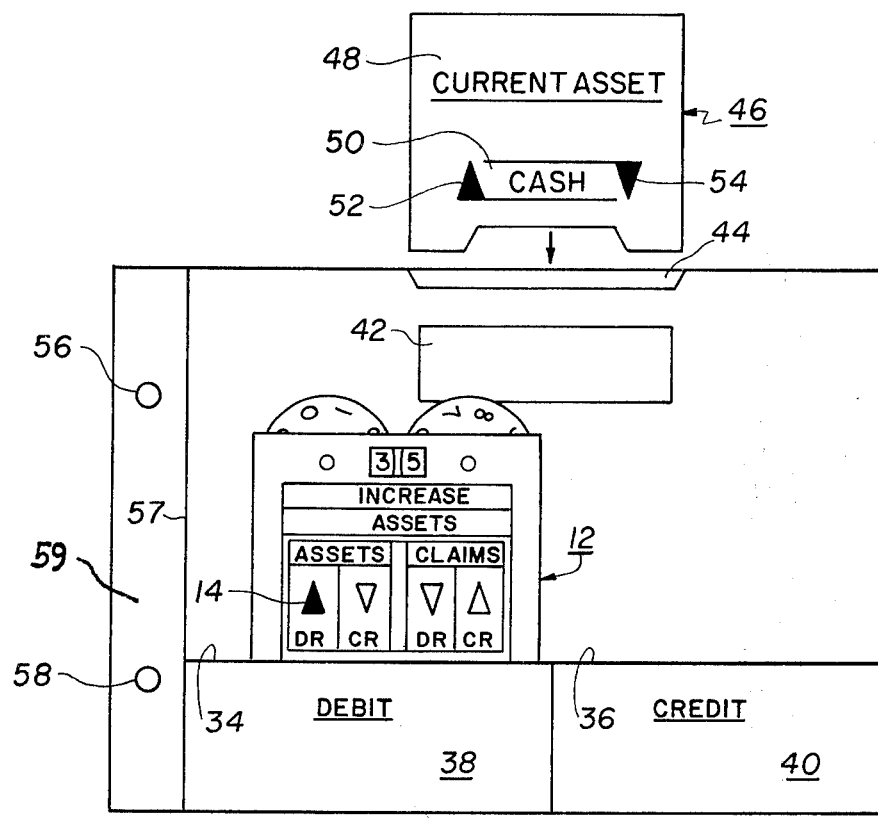
FIG. 4 illustrates a ledger page and insertable title tag with a debit transaction card positioned in the debit pocket of the ledger page in accordance with the present invention.
Figure 5:
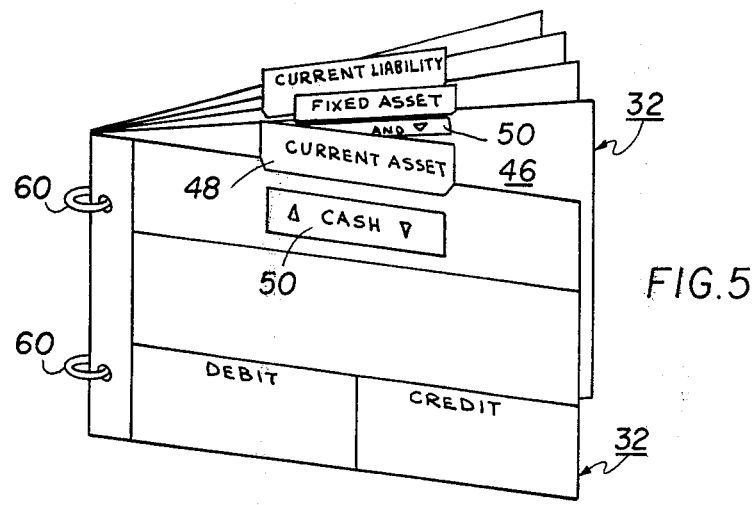
FIG. 5 shows a ledger comprising a plurality of the ledger pages of FIG. 4.
Figure 6:
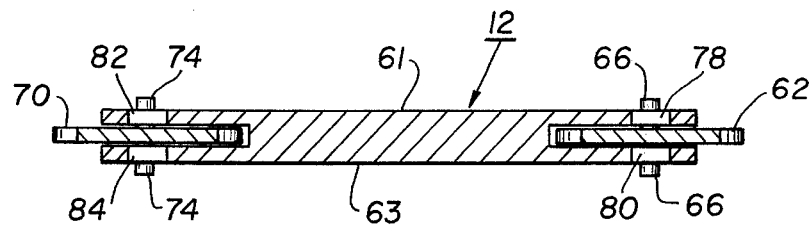
FIG. 6 is a section view, in elevation, taken along lines 6—6 of FIG. 2.

The credit transaction cards 22 are similarly structured. Two disks 86, 88 are rotatably attached to the top portion of the card by rivets 90, 92 and rivets 102, 104 rotatably attach disks 98, 100 to the bottom portion of said card 22. Sight windows 94, 96 will display the numerals on disks 86, 88 while window 106, 108 display the numerals on disks 98, 100. In accordance with the present invention, transaction cards 12, 22 are "posted" in ledger pages 32 with the accounting indicia visible, see FIG. 4. Ledger page 32 is generally rectangular in shape and contains a debit pocket 34 and a credit pocket 36 for receiving appropriate transaction cards 12. A slot 44 and companion window 42 is provided at the top of ledger page 32 to receive and display an insertable title tag 46. At the extreme left side of page 32 a crease or fold line 57 is provided to establish a rigid margin 59. A pair of spaced holes 56, 58 in said margin 59 may be used in conjunction with a ring binder (not shown) or ring fasteners 60 to join a plurality of ledger pages 32 into a ledger (see FIG. 5).

Each ledger page 32, in accordance with the present invention, functions as a "T" account. Debits are posted by inserting the appropriate transaction card 12 into debit pocket 34. Credits are similarly posted by inserting cards 12 into credit pocket 36. These steps will be more fully described hereinafter.

Title tag 46 contains the nature of the account 48, e.g. current asset, the title of the account 50, e.g. cash, and a pair of indicating arrowheads 52, 54 one on each side of the account title, to aid the student in understanding on what side of the account increases or decreases are to be posted. Once the title tag 46 is properly inserted in slot 44, the title of the account 50 and indicating arrowheads 52, 54 will be displayed through window 42.

The devices of the present invention may be used as either a teaching aid or an educational game. As a teaching device, in the teacher-student environment, the invention enables an instructor to develop a commercial account through a set of facts and the student, using the components of the invention, must accurately balance the transactions of the business for some stated accounting period. As an educational game, the invention contemplates the inclusion of preestablished fact patterns for a variety of business entities. Each player is given a copy of a specific fact pattern and the object of the game is to quickly and accurately post all transactions, closeout and balance all appropriate accounts and develop a profit and loss picture for the business in question. The first player to accurately complete the book-keeping assignment is the winner. Answer sheets are provided corresponding to each fact pattern so the players may compare their results with the correct postings and balances.

To illustrate the use of the present invention as a teaching aid, the following transactions of one John Doe, a parking lot proprietor, will be explained, posted and closed-out using the components of the present invention.

John Doe decided to buy a piece of land near the local railroad station to be used as a parking lot. First, he opened a bank account in the business name: John's Parking Lot; and, deposited therein $24,000.00 to start his business. Mr. Doe thereafter bought the land desired for $20,000.00 drawn from the business account. During the first quarter of business Mr. Doe had borrowed a total of $6,000.00 and had received $12,000.00 in parking fees. In addition a total of $3,000.00 had been paid out in that period for various operating expenses including printing, advertising and interest on loans. A total of $4000.00 of the amounts borrowed was repaid during that period. Mr. Doe had withdrawn a total of $7000.00 from the business during that same quarter.

After a review of the fact pattern, the student will create the following account title tags, Cash, Land, Notes Payable, Capital (John Doe), Parking Income, Expenses, Profit and Loss. These title tags will each be inserted into each of seven ledger pages constructed in accordance with the present invention.

The student will then commence to "post the entries" by selecting the appropriate transaction card, rotating the appropriate disks so that the value of the transaction is accurately displayed through the companion sight window and thereafter inserting the card in the appropriate pocket of the ledger page for the account affected. Accordingly, the student will first select a transaction card indicating "Increase Assets" and cause 24 to be displayed through the sight window for Increase Assets. This card will then be inserted into the debit pocket of the Cash account ledger page. Under the principles of double-entry bookkeeping, a second entry must be posted. The student will select a transaction card marked: "Increase Capital" and again display a 24. This card will be inserted into the credit pocket of the Capital account ledger page. This simple transaction illustrates one of the basic principles of accounting: you debit increases in assets and credit increases in capital. The construction of the ledger pages in accordance with the present invention further teaches that debits are "entered" in the left side and credits in the right side of the basic T accounts.

The student will then post the next transaction: the purchase of the land. He will select an Increase Asset transaction card and set it at 20 and thereafter insert this card into the debit pocket of the Land account ledger page. A "Decrease Assets" card will be set at 20 and inserted into the credit pocket of the Cash account ledger page.

The borrowing of $6,000.00 will be posted by debiting the Cash account. Since a Increase Assets card is already in the debit pocket of this ledger page, the student merely increases the value shown on this card by 6 to display 30. A "Increase Liabilities" card is set at 6 and inserted into the credit pocket of the Notes Payable ledger page.

The teaching device of the present invention has, in these three simple transaction, graphically and physically illustrated the following accounting principles: (a) an increase in Assets will result in either an increase in Capital, an increase in Liabilities or a decrease in Assets; (b) an increase in Assets is debited: (c) an increase in Capital is credited; (d) an increase in Liabilities is credited; (e) a debit is made to the left side of the account and a credit is made to the right side of the account.

The student must next "post" the $12,000.00 received in parking fees. An entry must be made in the debit side of the Cash account and in the credit side of the Income account. Since a Increase Assets card is already in the debit pocket of the Cash account ledger page, the student merely adjusts the rotatable disks to display a value increased by 12. The student will select a "Increase Profit" card and set the value indicator to 12 and insert this card into the credit pocket of the Income account.

In like manner, the $3,000.00 in expenses is posted by inserting a "Decrease Profit" card with its value indicator set at 3 in the debit pocket of the Expense account ledger page and the value indicator of the "Decrease Assets" card in the credit pocket of the Cash account ledger page is increased by 3. To post the repayment of $4,000.00, the student will insert a "Decrease Liabilities" card set at 4, into the debit pocket of the Notes Payable account ledger page and the Decrease Assets card in the credit pocket of the Cash account ledger page is increased by 4.

Finally, the student will record Mr. Doe's withdrawal of $7,000.00 during the period. A Decrease Capital card, set at 7 is inserted in the debit pocket of the Capital (John Doe) account ledger page and the Decrease Assets card, in the credit pocket of the Cash account ledger page is increased by 7.

Thus, all transactions for the period under study have been posted. The student must now balance each account. This is done by comparing the values indicated on the card in each pocket of an account ledger page and recording the difference— the excess of either debits or credits— on the appropriate pocket. If the debits exceed the credits in a particular account, the difference is called a "debit balance". The reverse situation yields a "credit balance" for the particular account. If all entries were properly made, the total of the debit balance will equal the total of all credit balances. If this "trial balance" criteria is satisfied, the student will close-out the temporary accounts to determine profit or loss for the business during the period under study.

In closing out a temporary account its balance must be brought to zero. Accordingly, a Increase Profit card set at 3 is inserted in the credit pocket of the Expenses account ledger page thereby bringing that account balance to zero. Under the principles of double-entry bookkeeping, the Profit and Loss summary account is debited by inserting a Decrease Profit card set at 3 into the debit pocket of the account's ledger page. Similarly, Parking Income is debited and Profit and Loss is credited an equal amount: 12. After both temporary accounts are closed, the student will strike a balance for the Profit and Loss summary account. Under the facts in the example being considered, the Profit and Loss account results in a credit balance of 9, i.e. the business showed a profit of $9,000.00 during the period.

Since the Profit and Loss summary account is similarly a temporary account, it too must be closed-out and its balance transferred to the permanent Capital account. Consequently, in the manner heretofore explained, Profit and Loss is debited 9 and Capital (John Doe) is credited 9. The student may now prepare a post-closing trial balance which should compare favorably with that held by the instructor.

The foregoing description is intended to be merely illustrative of presently preferred embodiments of the present invention within an exemplary environment. A latitude of modification, change and substitution is intended wherein some features of the invention will be employed without a corresponding use of other features so described herein. Accordingly, various modes of carrying out the invention are contemplated as being within the scope of the following claims.

I claim:

1. A transaction card adapted for use with an educational accounting device comprising: a flat rectangular body having an upper and a lower portion and bearing accounting indicia on the face thereof; a pair of adjacent disks rotatably attached to said upper portion and protruding slightly from the top edge of said body; a sight window on the face of said body in proximity to said top edge; each disk having a circular series of numerals from 0 through 9 appearing thereon whereby each disk may be conveniently turned by the fingers and thereby selectively display one numeral from each disk through said sight window; and, the numerical value displayed through said window together with said accounting indicia representing a part of an accounting entry.

2. A transaction card according to claim 1 wherein said accounting indicia appears on said upper portion; accounting indicia appears on said lower portion of said body in inverse orientation to said upper portion; a second pair of adjacent disks rotatably attached to said lower portion and protruding slightly from the bottom edge of said body; a second sight window on the face of said body in proximity to said bottom edge; said second pair of disks constructed similar to the first pair so as to cooperate with said second sight window and the accounting indicia on said lower portion to represent a part of an accounting entry.

3. A transaction card according to claim 2 including an upper and lower portion on the reverse side of said body; accounting indicia appearing on said upper portion and accounting indicia appearing on said lower portion in inverse orientation to said upper portion; a sight window on said reverse side in the upper portion in proximity to said top edge and a sight window on said reverse side in the lower portion in proximity to said bottom edge; each of said four disks having a circular series of numerals from 0 through 9 appearing on its reverse side whereby said first pair of disks cooperates with the sight window in the upper portion of the reverse side of said body and the accounting indicia appearing thereon to represent a part of an accounting entry and said second pair of disks cooperates with the sight window in the lower portion of the reverse side of said body and the accounting indicia appearing thereon to represent a part of an accounting entry.

* * * * *